United States Patent [19]

Darringer et al.

[11] 4,315,150
[45] Feb. 9, 1982

[54] TARGETED INFRARED THERMOMETER

[75] Inventors: Richard E. Darringer, Fullerton; Wayne L. Scharf, Silverado; James S. Haggerty, Mission Viejo, all of Calif.

[73] Assignee: Telatemp Corporation, Fullerton, Calif.

[21] Appl. No.: 171,967

[22] Filed: Jul. 24, 1980

[51] Int. Cl.$^3$ ............................................... G01J 1/00
[52] U.S. Cl. .................................... 250/338; 250/342; 250/353
[58] Field of Search ............... 250/338, 340, 341, 342, 250/353; 356/153, 251; 350/20

[56] References Cited

U.S. PATENT DOCUMENTS

| | | | |
|---|---|---|---|
| 3,502,874 | 3/1970 | Astheimer | 250/330 |
| 3,752,587 | 8/1973 | Myers et al. | 356/153 |
| 4,078,179 | 3/1978 | Everest | 250/340 |
| 4,087,689 | 5/1978 | Asawa | 250/342 |
| 4,139,769 | 2/1979 | McCrum et al. | 250/341 |
| 4,142,799 | 3/1979 | Barton | 356/153 |

Primary Examiner—Alfred E. Smith
Assistant Examiner—Janice A. Howell
Attorney, Agent, or Firm—Edward D. O'Brian

[57] ABSTRACT

An apparatus for use in determining the temperature of or at a specific area by measuring the infrared radiation from that area through the use of a reflector structure to direct the radiation from the area to an infrared detector can be improved by using a laser to provide two light beams which are directed so as to intersect at a distance from the apparatus corresponding to the principal focus of the reflector structure.

9 Claims, 1 Drawing Figure

U.S. Patent   Feb. 9, 1982   4,315,150
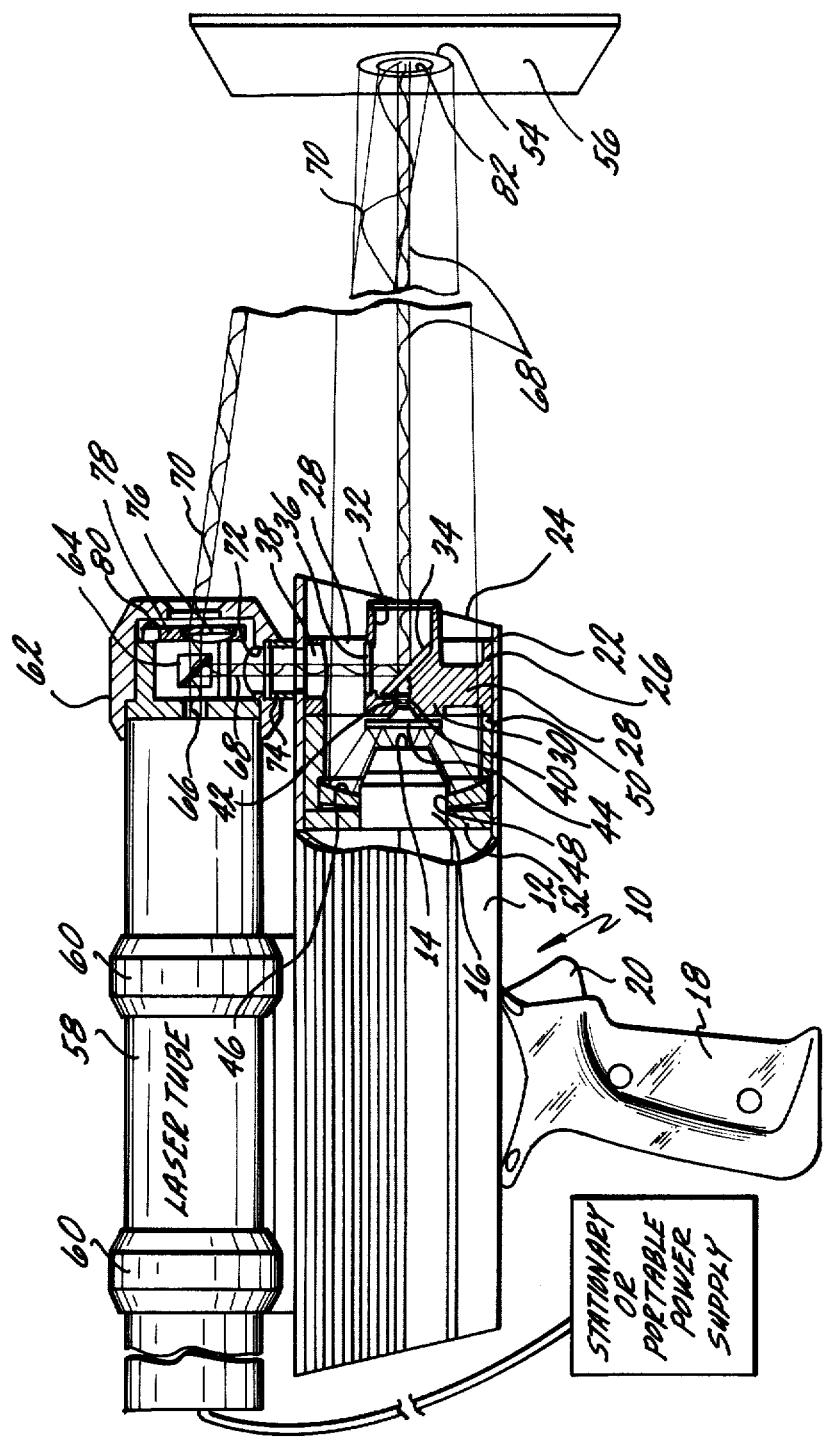

TARGETED INFRARED THERMOMETER

BACKGROUND OF THE INVENTION

The invention set forth in this specification pertains to new and improved infrared thermometers and more specifically to infrared thermometers which utilize light from a collimated light source, preferably a laser, for targeting purposes so that the infrared thermometer will be used at a specific, desired distance from an area.

It is considered that an understanding of the invention will be facilitated by an explanation of certain of the terms used in referring to the present invention. The term "infrared thermometer" used in this specification is a comparatively recent English term or expression which is commonly utilized to designate an apparatus which determines temperature by measuring the infrared radiation given off from a specific area such as, for example, at a specific area along a surface, within a container or the like.

It is considered that it is well established that it is desirable to construct such infrared thermometers utilizing a housing containing an infrared radiation detector, appropriate electronics for indicating temperature in accordance with the radiation received by such a detector and a reflector structure for use in transmitting the radiation emitted from a specific area where the temperature measurement is being made to the infrared detector. Normally a hood is located generally around the reflector structure and the infrared detector so as to exclude ambient radiation from reaching the infrared detector.

Normally the reflector structure utilized reasonably corresponds to reflector structures such as are commonly employed in various types of telescopes. For the purposes of the present invention it it considered to be relatively immaterial as to whether or not the reflector structure is of a Cassegrainian, a Newtonian, a Gregorian or a Coude focus type or of a modification of any of these. It is considered relatively undesirable to utilize a prime focus type of reflector structure for reasons which are relatively unimportant to an understanding of this invention.

All of these types of reflector structures can be constructed so as to be focused at infinity. This is considered desirable when an instrument is to be used in taking temperature measurements of an area at a significant distance from an infrared thermometer. All of these types of reflector structures can also be constructed to be focused at a comparatively small area or spot at a specific distance from an infrared thermometer. Such a comparatively small area or spot may be referred to as a focal point of the optical structure. It is considered, however, that it is better practice to refer to such a comparatively small area or point as the principal focus of the reflector structure since such a reflector structure may not be as accurate as desired from an optical standpoint and, hence, may not accurately focus on a theoretical type focal point. Such a principal focus may be defined as the smallest area from which radiation can be transmitted using a reflector structure as herein indicated.

The construction of an infrared thermometer so that the reflector structure used with it has such a principal focus is considered to be quite desirable in many applications of infrared thermometers. Frequently the users of such devices will desire to determine the precise temperature of a specific, frequently small part in a relatively inaccessible location such as, for example, a specific small bearing within a large gear box. A problem in making a temperature measurement at such a precise location with a known infrared thermometer concerns the relative difficulty involved in locating the infrared thermometer so that the area where the temperature measurement is to be made is located precisely at the principal focus of the reflector structure used. Such precise placement is necessary in order to ensure the accuracy of any temperature measurement made.

Such precise placement in effect involves two different factors: (1) alignment of the infrared thermometer "optics" or reflective system with the target area involved in making the temperature measurement; and (2) precise control of the distance of the thermometer from the target area. Although the matter of securing a precise desired position of an infrared thermometer can be handled by the use of conventional "tools" such as a graduated scale, or a range finder, or the like, and a sighting scope or the like, the use of such expedients is not considered desirable. Frequently an individual utilizing an infrared thermometer finds it very inconvenient to take the time to separately utilize two different locating "expedients" as indicated. Frequently time considerations such as are involved in making a temperature measurement on a moving part which is only visible for a comparatively short period preclude the use of such time consuming positioning expedients.

SUMMARY OF THE INVENTION

As a result of these considerations it is considered that there is a need for new and improved infrared thermometers and more specifically that there is a need for infrared thermometers which are constructed so that they may be easily and conveniently "targeted" in such a manner that they are directed toward a precise spot or area and are concurrently located at a distance from such a spot or area such that the spot or area is at the principal focus of the reflector structure or system used in the thermometer. A broad objective of the present invention is to fulfill this need.

More specifically it is intended by this invention to provide targeted infrared thermometers as indicated in the preceding which are not significantly difficult to construct and which may be easily and conveniently used for their intended purposes. This latter is considered quite important with the present invention. The infrared thermometers of the present invention are considered to be particularly desirable because they can be utilized so as to locate a precise spot or area at the principal focus of the infrared thermometer.

In accordance with this invention these various objectives of the invention are achieved by providing an apparatus for determining temperature by measuring infrared radiation, said apparatus including an infrared radiation detector and a reflector structure for directing radiation given off at a specific area in front of and remote from said apparatus to said detector, said reflector structure including a primary reflector and a secondary reflector, said primary reflector being shaped and located so as to reflect radiation given off at said area toward said secondary reflector, said secondary reflector being shaped and located so that radiation reflected toward it by said primary reflector is reflected by it to said infrared radiation detector, said reflector structure having an optical axis in which the improvement comprises: a collimated light source means mounted on said apparatus, beam splitting means for splitting light emitted by said light source means into two separate beams, a mirror positioned on said apparatus adjacent to said reflector structure so as to intercept a first of said separate beams and reflect it along said optical axis of said reflector structure, beam directing means positioned on said apparatus so as to intercept the other of said separate beams and to direct said other of said separate beams so that it crosses the first of said separate beams at a point remote from said apparatus.

BRIEF DESCRIPTION OF THE DRAWING

Because of the nature of this invention it is best more fully explained with reference to the accompanying drawing in which:

The FIGURE is a diagrammatic view, partially in section, of a presently preferred embodiment or form of an apparatus in accordance with this invention.

The precise apparatus illustrated is constructed so as to utilize the principles or concepts of the invention set forth and defined in the appended claims. Those skilled in the field of making temperature measurements by measuring infrared radiation will realize that these concepts or principles can be employed in a variety of differently appearing and differently constructed infrared thermometers through the use or exercise of routine engineering skill.

DETAILED DESCRIPTION

In the drawing there is shown an infrared thermometer 10 of the present invention which utilizes a housing 12 containing appropriate, known electronic components (not shown) for providing a temperature reading in accordance with the infrared radiation reaching a radiation receiving surface 14 on a known infrared radiation detector 16. This housing 12 preferably is secured to a small handle 18 which may be utilized in manipulating the entire thermometer 10 as it is used. Normally the handle 18 will carry a trigger 20 used in turning the thermometer 10 on and off.

A tubular extension 22 on the front (not separately numbered) of the housing 12 serves as a shield in order to tend to isolate various components as hereinafter set forth from the ambient light. This extension 22 has an open front end 24. A small sleeve 26 is located within the extension 22 so as to be secured against movement. This sleeve 26 has a series of radial arms 28 which extend inwardly from it so as to support a mounting 30.

This mounting 30 has an internal cavity 32 in which there is located a reflective mirror 34. This mirror 34 is located adjacent to a hole 36 leading into the cavity 32; the hole 36 is in alignment with another hole 38 in the sleeve 26. The mounting 30 also includes a centrally located threaded hole 40 which carries a small threaded shaft 42 extending from the center of the back (not separately numbered) of a small disk shaped flat mirror 44. This mirror 44 is located directly opposite the radiation receiving surface 14 and may be moved toward and away from it by adjusting the position of the shaft 42 within the hole 40.

This mirror 44 may be referred to as a secondary reflector since it is intended to reflect radiation received from a primary reflector 46 to the surface 14. This primary reflector 46 is provided with a centrally located aperture 48 located around the detector 16. It is normally held in place by another retaining sleeve 50 against a wall 52 in the housing 12. The two mirrors 44 and 46 may be referred to as a reflector structure (not separately numbered) have an optical axis (not shown) which extends perpendicular to the center of the mirror 44. This optical axis also extends perpendicular to the center of the surface 14 since the mirror 44 is always parallel to the surface 14 with the construction shown.

This reflector system consisting of the two mirrors 44 and 46 has a principal focus 54 as indicated by a circle on a surface 56. Normally the target area for a temperature measurement will coincide with this principal focus 54 as a temperature measurement is made. This principal focus 54 corresponds to what is commonly referred to as a focal point but is not a true or accurate focal point because the two mirrors 44 and 46 are shaped so that by adjustment of the mirror 44 this principal focus 54 may be located at varying distances from the thermometer 10. As indicated in the preceding this principal focus 54 corresponds to the smallest area from which infrared radiation may be "picked up" and transmitted to the surface 14 utilizing the reflector system defined.

In the thermometer 10 a conventional laser tube 58 is mounted on the housing 12 by brackets 60. A small housing 62 is located on this tube 58 so as to support a conventional beam splitter 64 so that a collimated, coherent light beam 66 emitted from the laser tube 58 will strike this splitter 64 so as to be split into a first separate beam 68 and a second separate beam 70. The splitter 64 directs this first beam 68 through an opening 72 in the housing 62 and then through a tube 74 connecting the housing 62 with the housing 12 and then through the openings 38 and 36 toward the mirror 34. This mirror 34 is located at an angle shown so that this beam 68 will be reflected outwardly from the thermometer 10 as indicated along and in alignment with the optical axis (not shown) referred to in the preceding discussion.

The second beam 70 will pass from the splitter 64 toward a peripheral portion of a lens 76. This lens 76 is held by a small mounting bracket 78 within the housing 62 in a known or conventional manner so that the position of the bracket 78 may be adjusted through the use of mounting screws 80. This lens 76 is used instead of a prism because it will direct the beam 70 outwardly from the thermometer 10 so that it will intersect the beam 68 at the principal focus 54 as indicated in the drawing and because it will concurrently cause this beam 70 to "expand" or diverge in a conical manner. As a result of this "expansion" the beam 70 will strike a surface such as the surface 56 and appear substantially as a circle 82 surrounding the beam 68 at this surface 56.

There are several advantages to this. It is considered that it is somewhat easier for the normal person to determine when a circle is concentric around essentially a dot-like area than it is for such a person to determine if two dot-like areas are coincident. This is believed to facilitate the proper placement of the thermometer 10. Further, this use of an expanding beam 70 is desirable in that it provides a limited amount of illumination so as to facilitate a user of the thermometer 10 being able to see and locate a target area.

It is believed that the operation of the thermometer 10 will be essentially self-evident and obvious from the preceding discussion. As the thermometer 10 is used the user will direct the beam 68 toward the area where a temperature measurement is desired. Concurrently the user will move the thermometer 10 toward or away from such an area until such time as the beam 70 surround the beam 68 as indicated in the drawing. At this time a temperature measurement will be made utilizing the thermometer 10 in a standard manner. Reasonably conventional lasers such as will normally be used in an application such as this such as known heliumneon lasers will not normally interfere with the temperature measurement obtained because of the frequency sensitivity of the infrared detector 16 and its associated circuit employed and also because of the low amounts of power involved in the operation of the laser tube 58.

We claim:

1. An apparatus for determining temperature by measuring infrared radiation, said apparatus including an infrared radiation detector and a reflector structure for directing radiation given off at a specific area in front of and remote from said apparatus to said detector, said reflector structure including a primary reflector and a secondary reflector, said primary reflector being shaped and located so as to reflect radiation given off at said area toward said secondary reflector, said secondary reflector being shaped and located so that radiation reflected toward it by said primary reflector is reflected by it to said infrared radiation detector, said reflector structure having an optical axis, in which the improvement comprises:

a collimated light source means mounted on said apparatus, beam splitting means for splitting light emitted by said light source means into two separate beams, a mirror positioned on said apparatus adjacent to said reflector structure so as to intercept a first of said separate beams and reflect it along said optical axis of said reflector structure, beam directing means positioned on said apparatus so as to intercept the other of said separate beams and to direct said other of said separate beams so that it crosses the first of said separate beams at a point remote from said apparatus.

2. An apparatus as claimed in claim 1 wherein:
said reflector structure has a principal focus,
said beam directing means directs said other of said separate beams so that it crosses the first of said separate means at said principal focus.

3. An apparatus as claimed in claim 2 wherein:
said beam directing means causes said other of said separate means to expand into a conical shape as it extends away from said beam directing means.

4. An apparatus as claimed in claim 1 wherein:
said primary reflector has an aperture in its center and is located around said infrared radiation detector,
said infrared radiation detector has a radiation receiving surface which is perpendicular to said optical axis,
said secondary reflector is located in front of said radiation receiving surface,
said mirror is located in front of said secondary reflector.

5. An apparatus as claimed in claim 1 wherein:
said apparatus includes a hood for excluding ambient light located at the front end of said apparatus, said hood being located generally around and in front of said infrared radiation detector and said reflector structure, said hood having an open front end,
said apparatus also including a mounting located interiorly of said hood and support means connecting said mounting to said hood,
said mirror and said secondary reflector are located on said mounting in front of said infrared detector and said primary reflector,
said infrared detector including a flat radiation receiving surface, said radiation receiving surface being located perpendicular to said optical axis and being symmetrically located around said optical axis,
said secondary reflector is located symmetrically about said optical axis facing said radiation receiving surface,
said apparatus further including cooperating adjusting means connecting said secondary reflector and said mounting so as to permit said secondary reflector to be moved along the length of said optical axis, and
said light source means is a laser.

6. An apparatus as claimed in claim 5 wherein:
said secondary reflector is a flat mirror.

7. An apparatus as claimed in claim 5 wherein:
said reflector structure has a principal focus,
said beam directing means directs said other of said separate beams so that it crosses the first of said separate beams at said principal focus.

8. An apparatus as claimed in claim 7 wherein:
said beam directing means is a portion of a lens which causes such other of such separate means to expand into a conical shape as it extends away from said beam directing means.

9. An apparatus as claimed in claim 5 wherein:
said secondary reflector is a flat mirror,
said reflector structure has a principal focus,
said beam directing means directs said other of said separate beams so that it crosses the first of said separate beams at said principal focus,
said beam directing means is a portion of a lens which causes such other of such separate means to expand into a conical shape as it extends away from said beam directing means.

* * * * *